United States Patent
Roudaut et al.

(10) Patent No.: US 10,899,165 B2
(45) Date of Patent: Jan. 26, 2021

(54) DEVICE THAT PRODUCES COLOR ON DEMAND

(71) Applicant: SOCIÉTÉ BIC, Clichy (FR)

(72) Inventors: Etienne Roudaut, La Garenne Colombes (FR); Guillaume Caffier, Wegscheid (FR); Loic Folgoas, Paris (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 16/388,176

(22) Filed: Apr. 18, 2019

(65) Prior Publication Data
US 2019/0322119 A1    Oct. 24, 2019

(30) Foreign Application Priority Data
Apr. 19, 2018  (EP) .................... 18305483

(51) Int. Cl.
| | |
|---|---|
| *B43K 7/02* | (2006.01) |
| *B43K 29/08* | (2006.01) |
| *B43K 5/02* | (2006.01) |
| *B43K 29/00* | (2006.01) |
| *B43K 8/22* | (2006.01) |

(52) U.S. Cl.
CPC ............ *B43K 5/025* (2013.01); *B43K 7/02* (2013.01); *B43K 29/003* (2013.01); *B43K 29/08* (2013.01); *B43K 8/22* (2013.01)

(58) Field of Classification Search
CPC . B43K 5/18; B43K 5/189; B43K 7/10; B43K 8/04; B43K 5/025
USPC .................................. 401/1, 2, 47
See application file for complete search history.

(56) References Cited

U.S. PATENT DOCUMENTS

| | | | |
|---|---|---|---|
| 5,911,533 A | 6/1999 | Fassler | |
| 6,050,680 A | 4/2000 | Moriyama | |
| 6,394,598 B1 * | 5/2002 | Kaiser | B41J 3/36 347/109 |
| 6,454,482 B1 * | 9/2002 | Silverbrook | B41J 2/17503 346/140.1 |
| 8,403,577 B2 * | 3/2013 | Khoshnevis | B41J 3/36 401/35 |
| 2003/0138282 A1 | 7/2003 | Payne | |
| 2004/0125089 A1 | 7/2004 | Chao | |
| 2006/0244805 A1 | 11/2006 | Yeh | |

(Continued)

FOREIGN PATENT DOCUMENTS

| | | |
|---|---|---|
| DE | 102016009576 A1 | 2/2018 |
| EP | 2072277 A1 | 6/2009 |

(Continued)

OTHER PUBLICATIONS

European Search Report issued in related EP application No. 18305483 dated Oct. 26, 2018 (9 pages).

*Primary Examiner* — David P Angwin
*Assistant Examiner* — Bradley S Oliver
(74) *Attorney, Agent, or Firm* — Bookoff McAndrews, PLLC

(57) ABSTRACT

A device for reproducing a color on demand. The device includes a body including a tip and a scanner. The body also includes a control unit, a plurality of ink reservoirs, an ink supply system, a mixing tank and a sensor. The control unit communicates with the scanner and ink supply system to reproduce a desired color that has been scanned.

20 Claims, 4 Drawing Sheets

(56) References Cited

U.S. PATENT DOCUMENTS

| | | | |
|---|---|---|---|
| 2007/0070097 A1* | 3/2007 | Bich | ................. B43M 11/06 |
| | | | 347/8 |
| 2010/0061793 A1 | 3/2010 | Bender | |
| 2017/0274699 A1* | 9/2017 | Schwendimann | ....... B41M 5/26 |
| 2018/0272379 A1* | 9/2018 | Skinner | ............ B05C 17/00526 |
| 2019/0286176 A1* | 9/2019 | Aida | .................. B41J 2/04563 |

FOREIGN PATENT DOCUMENTS

| | | |
|---|---|---|
| JP | 2009078568 A | 4/2009 |
| WO | 9317872 A1 | 9/1993 |
| WO | 2010035836 A1 | 4/2010 |

\* cited by examiner

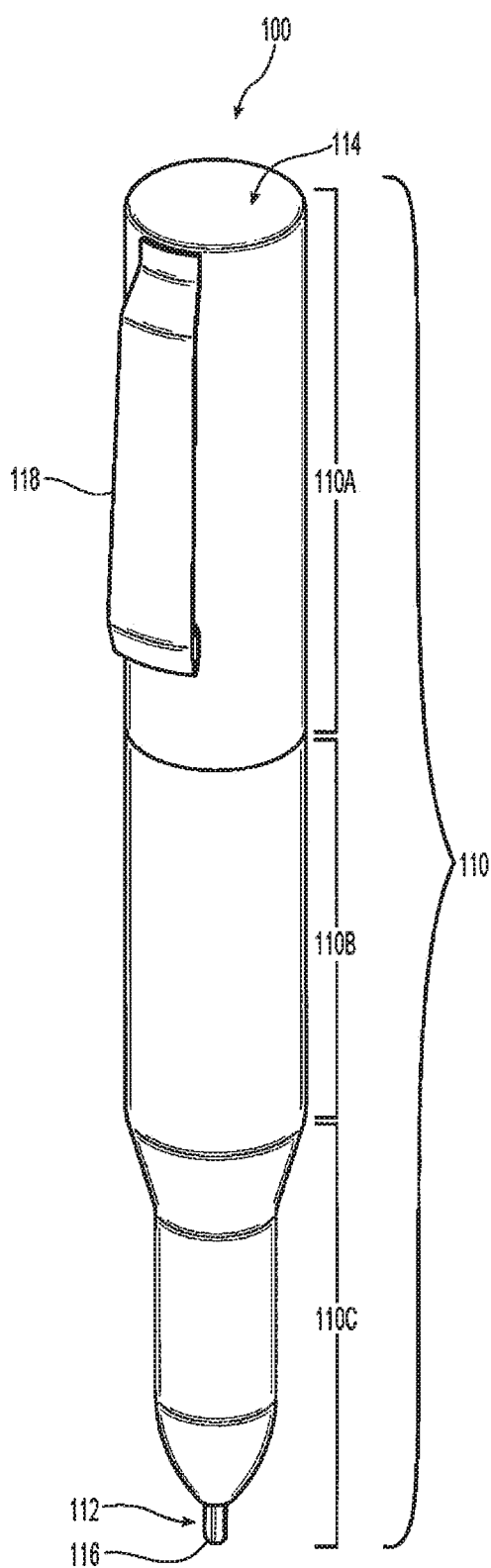
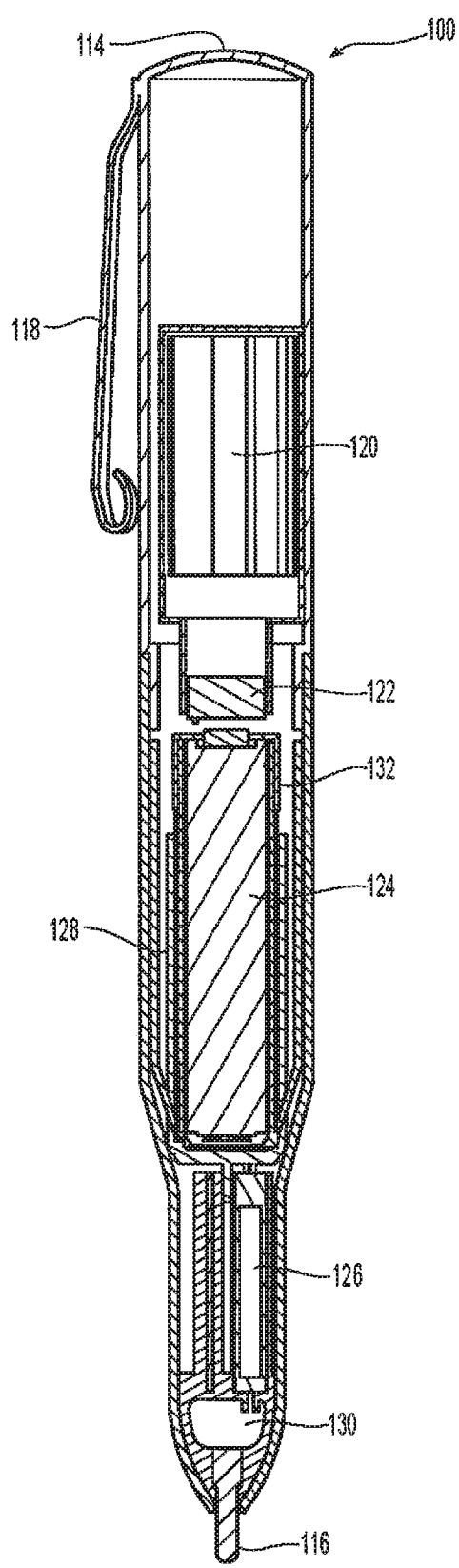
Fig. 1
Fig. 2

US 10,899,165 B2

DEVICE THAT PRODUCES COLOR ON DEMAND

CROSS REFERENCE TO RELATED APPLICATION(S)

This application claims priority to European Application EP18305483.2, filed Apr. 19, 2018, the entire content of which is incorporated herein by reference.

BACKGROUND

1. Field

The following description relates to devices capable of producing colors on demand. More particularly, the description relates to devices which inspects any color and reproduce the exact color on demand.

2. Description of Related Art

Conventional devices include ink cartridges contained in the body of a writing instrument wherein the color generated is controlled by a control circuit and buttons formed on an external surface of the device. Other conventional devices may include user-initiated color reproduction wherein the user selectively inputs ratios of color from cartridges to obtain a desired color.

SUMMARY

Aspects of the disclosure involve a device for producing a color on demand. The device may include an inspection tool for capturing the color, a plurality of ink reservoirs, an ink supply system, a mixing chamber, and a control unit. Each one of the plurality of ink reservoirs may be configured to hold a different color ink. The ink supply system may be fluidly connected to the plurality of ink reservoirs to receive ink from the plurality of ink reservoirs and may be configured to control the color of ink disposed therein. The mixing chamber may be fluidly connected to the ink supply system and may be configured to mix the ink received from the ink supply system. The control unit may be operatively connected to the plurality of ink reservoirs, the ink supply system and the inspection tool for controllably reproducing and dispersing the color captured by the inspection tool.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the present disclosure is not limited to the precise embodiments and features shown. The accompanying drawings, which are incorporated in and constitute a part of this specification, illustrate an implementation of aspects consistent with the present disclosure and, together with the description, explain advantages and principles consistent with the present disclosure.

FIG. 1 is a perspective view of a device that produces color on demand.

FIG. 2 is a cross-sectional view of the device of FIG. 1.

DETAILED DESCRIPTION

Figure 3:
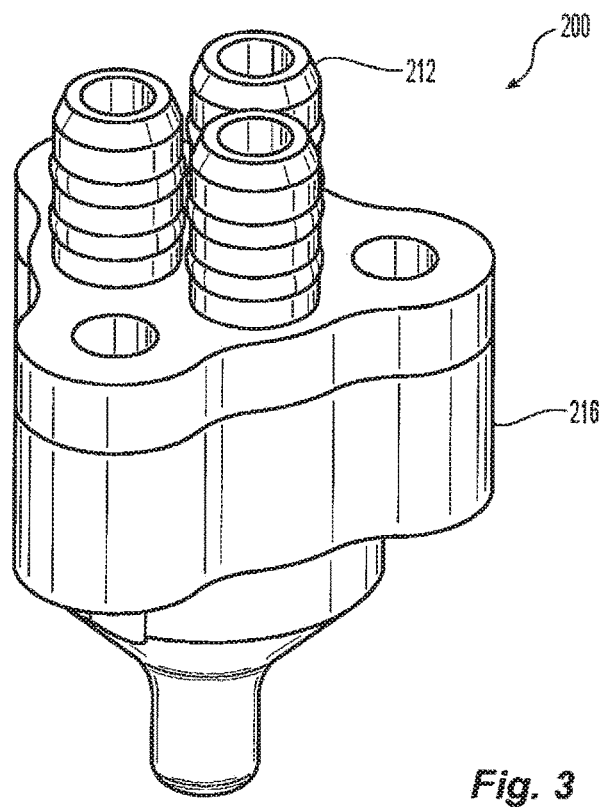
FIG. 3 is a perspective view of an embodiment of an ink supply system.

Aspects of the disclosure, as shown in FIGS. 1 and 2, involve a device 100 that produces color on demand. The device 100 may be a writing instrument, such as for example, a pen. While a writing instrument and pen are detailed herein, the device may be any similar device that may be capable of detecting color and reproducing the color being detected for use on paper or any surface known in the art for writing, drawing, etc. The device 100 may include a body 110, having a first end 112 and a second end 114. The first end 112 of the body 110 may include a tip 116 capable of performing the writing, drawing, etc. The tip 116 may be, for example a felt tip, ball point tip or any other tip well known for writing, drawing, etc. The second end 114 of the body 110 may include a clip mechanism 118 or an eraser.

According to some aspects, the body 10 may include an upper portion 110A, an intermediate portion 110B and a lower portion 110C. The upper, intermediate and lower portions 110A-110C may be separable in any combination of two or three portions. For example, the body 110 may include the upper 110A and the lower portion 110C where the upper portion 110A and the intermediate portion 110B may form the upper portion 110A or the intermediate portion 110B and the lower portion 110C may form the lower portion 110C. The upper, intermediate and lower portions 110A-110C may be connected to one another by snap-fit, twist/screw connection or by any other similar connection that is known in the art. According to other aspects, the body 110 may also be a unitary or single component. The clip 118 and the eraser may be disposed on the upper portion 110A of the body 110, and the tip 116 may be disposed at an end-most region of the lower portion 110C.

According to further aspects, the device 100 may be capable of inspecting and capturing certain characteristics relating to a desired color. Hence, the upper portion 110A may also include an inspection and capturing tool, such as a scanner 120. The scanner 120 may be, for example, at least a single-pixel camera positioned on an outer surface of the upper portion 110A of the body 110 of the device 100. According to some aspects, the camera may also be, for example, a multi-pixel camera. The scanner 120 may be operable for detecting and capturing the color to be reproduced. According to further aspects, the scanner 120 may be any similar mechanism that satisfies at least the following characteristics: 1) operable under controlled light and 2) capable of isolating the area being scanned and/or filtering unwanted light from the area being scanned. Additionally, the scanner 120 may be configured to be operable with other internal components of the device 100, such as for example, a control mechanism 122, a battery 124, and an ink supply system 126 to facilitate the reproduction of a color on demand, as further detailed herein below.

According to some aspects, the body 110 of the device 100 may include an interior that may house a control unit 122, a battery 124, an ink supply system 126, an ink reservoir 128, a mixing tank 130, and a sensor, all disposed therein. As noted above, the scanner 120 may be disposed on the outer surface of the body 110 near the upper portion 110A, while the control unit 122, battery 124, and ink reservoir 128 may be disposed in an intermediate portion 110B of the body 110; and the ink supply system 126, mixing tank 130 and sensor may be disposed in the lower portion 110C of the body 110. According to other aspects, the control unit 122, battery 124, ink supply system 126, ink reservoir 128, mixing tank 130 and sensor may be disposed in any portion of the body 110 without deviating from the scope of the disclosure.

The control unit 122 may be any electrical or mechanical system, such as for example, a radio frequency identification (RFID) circuit or other similar mechanism. According to other aspects, the control unit 122 may also be a microelectro-mechanical system (MEMS). The control circuit 122 may be configured to be connected to and facilitate communication between the scanner 120 and the ink supply system 126.

The ink reservoir 128 may be one reservoir 128; however, according to some aspects, the ink reservoir 128 may also be a plurality of ink reservoirs 128 such as, for example, as many as three, four, five, six or more ink reservoirs 128. The ink reservoirs 128 may be configured to contain ink. According to some aspects, the ink reservoirs 128 may each individually contain ink including, for example, colors that may be consistent with the RYB or CMY color models, such as for example red, yellow and blue or cyan, magenta and yellow. However, according to other aspects, the ink reservoirs 128 may each individually contain ink including, for example, colors that may be consistent with the CMYK or CMYKW color models, such as cyan, magenta, yellow, and black or cyan, magenta, yellow, black and white. While RYB and CMY color models may be detailed, the present disclosure may be practiced using any similar color subtracting/adding system that allows the mixing of colors to obtain a desired color.

According to some aspects, the ink reservoirs 128 may be configured to be disposed about the battery 124 wherein the ink reservoirs 128 may be, for example, concentric with the battery 124. While a concentric arrangement with regards to the ink reservoirs 128 and battery 124 is detailed, according to other aspects, the ink reservoirs 128 and battery 124 may be positioned in any arrangement within the interior of the body 110 of the device 100. The ink reservoirs 128 and battery 124, upon the depletion of ink contained within the reservoirs 128 or upon depletion of the energy stored in the battery 124 may be interchanged by the user. According to some aspects, the battery 124 may be, for example, a size AAAA battery or equivalent battery and the battery 124 may also be a rechargeable battery 124. According to further aspects, the ink reservoirs 128 and battery 124 may be configured within a housing 132 wherein the housing 132 may be removed from the body 110, as a single unit to allow for the ink reservoirs 128 and battery 124 to be each interchanged individually. However, according to other aspects, the ink reservoirs 128 and battery 124 may be contained within the body 110 of the device 100 individually, without a housing 132, each as a single unit, wherein the ink reservoirs 128 and battery 124 may be removed from the body 110 separately, as individual units. The ink reservoirs 128 and battery 124 may be configured to be operable with the control unit 122. The ink reservoirs 128, upon communication with the control unit 122, may be configured to provide a flow of ink to the ink supply system 126 wherein an appropriate amount of each ink color may be supplied to the mixing tanks 130 to reproduce the color scanned and for distribution onto a piece of paper or similar surface. The ink may be gel, thermochromic and/or any other ink that is very well known in the art. A more detailed explanation of the ink is detailed below.

Figure 4:
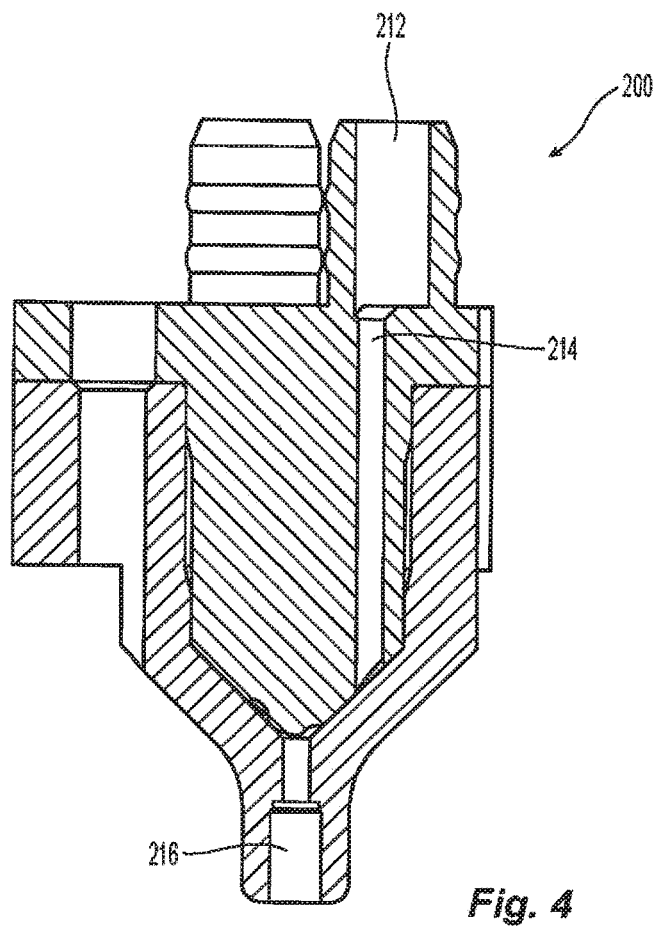
FIG. 4 is a cross-sectional view of the FIG. 3.

According to further aspects, the ink supply system 126 may be similar to, for example, a micropump system, such as an inkjet distribution system. However, as detailed in FIGS. 3 and 4, according to other aspects, the ink supply system 126, may be, for example, a thermal supply/distribution system 200. The thermal supply/distribution system 200 may include a body 210 having a number of connection ports 212 that may coincide with and may be in fluid communication with the number of ink reservoirs 128 contained within the body 110 of the device 100. While only three connection ports 212 are shown in FIGS. 3 and 4, any number of connection ports 212 may be suitable to correlate with the number of ink reservoirs 128. For example, the thermal supply/distribution system 200 may include three, four, or even five connection ports 212 to correlate with the cyan, magenta, yellow, black and/or white ink colors that may be used. The thermal supply/distribution system 200 may also include an ink supply channel 214 that may fluidly communicate with a distribution port 216. The ink supply channels 214 may include a heating mechanism, for example, an electric mechanism capable of being connected to and for receiving a signal from the control unit 122, such as an electrical wire. The heating mechanism may also be capable of generating heat to increase a temperature of the ink contained therein.

According to some aspects, the thermal supply/distribution system 200 may be used with a thermochromic ink. The thermochromic ink, may contain, for example, a plurality of micro-spheres in a gel-type substance. The size of the spheres may be, for example, less that 1 μm but not more than 5 μm. Each one of the micro-spheres may contain three components including a dye, developer and solvent. The solvent, may be for example, a wax-type substance that may be somewhat solid. The micro-sphere may appear colored when the dye is attached with the developer and "blanked" or transparent when the dye and developer are detached. According to some aspects, the color may be "blanked" or transparent when the wax-type substance or solvent in the micro-sphere may be heated to a temperature of, for example, of approximately 70° C. As such, the heating mechanisms contained in the ink supply channels 214 may cause the wax-type substance to melt thereby facilitating a change in color of the micro-sphere and initiating an adjustment/change of the color of the ink to be transformed/reproduced. The transformed colors may be formulated as the result of a signal received from the control unit 122 wherein the signal may facilitate the ink contained in the ink reservoirs 128 to flow from and be emptied into the ink supply channels 214 and later into the mixing tank 130. However, according to further aspects, the adjusted and/or changed colors, also formulated as a result of a signal received from the control unit 122, may be fluidly emptied from the ink supply channels 214 into the mixing tank 130. The mixing tank 130 may contain, for example, a series of swirl-type guiding conduit patterns to assist with facilitating a mixture of the adjusted and/or changed colors to obtain the transformed color to be reproduced. Additionally, and according to other aspects, the series of swirl-type guiding conduit patterns may contain a series of holes and heating mechanisms. The mixing tank 130, being positioned at the end-most region of the lower portion 110C, may be positioned just prior to the tip 116. Hence, a mix of the adjusted and/or changed colors may be performed prior to the ink entering the series of holes formed in the series of swirl-type guiding conduit patterns.

According to some aspects, the ink may contain micro-spheres varying in size and the temperature provided by the heating mechanisms may also vary. Thus, the micro-sphere size and content may dictate the temperature transition of the individual micro-sphere. Depending upon the micro-sphere temperature transition, the thermal supply/distribution system 200 may, at any given time, have a mix of individual micro-spheres separately changing state at different temperatures.

According to further aspects, the tip 116 may include a sensor. A friction force may be applied to the tip 116 of the device 100 may be detected by the sensor which may initiate a communication to the control unit 122. The control unit 122 may then, in turn, release a signal to the thermal supply/distribution system 200 and heating mechanisms contained in the ink supply channels 214 or series of swirl-type guiding conduit patterns. As noted above, the small spheres containing the color and wax-type substance may be heated, thereby melting the wax and changing the color of the sphere. The spheres may be heated to a desired temperature wherein the color in one or more of the ink supply channels 214 or series of swirl-type guiding conduit patterns is "blanked" or "partially blanked", at a temperature of, for example, of approximately 70° C. However, and simultaneously, the spheres of ink contained in the remaining supply channels 214 or series of swirl-type guiding conduit patterns may be adjusted/changed according to a surge of electrical resistance received from the heating mechanisms until the desired scanned color is obtained. The surge of electrical resistance may be the result of a signal sent from the control unit 122 to the heating mechanisms. The surge of electrical resistance may be the result of a signal received from the scanner and transmitted to the control unit 122. The control unit 122 may then convert the signal received from the scanner to a resistance required to heat the heating mechanisms to the temperature needed to 'blank out" and/or change the color in the ink spheres contained in the ink supply channels 214 or series of swirl-type guiding conduit patterns. The signal from the scanner 120 may be converted by the control unit 122 to thereby attain controlled ratios of resistance to manipulate the temperature of the spheres according to the required parameters of the characteristics of the color desired to be reproduced. The 'blanked out", "partially blanked" and/or change ink may then flow into the mixing tank 130 where the ink may then be mixed and transformed to obtain the scanned desired color. The scanned desired color may then be fluidly released through the tip 116 onto a paper, writing/drawing surface, etc. A release of the friction force from the tip 116 of the device 100, may also detected by the sensor. This release in friction force from the tip 116 may send another signal to the control unit 122 wherein the resistance supplied to the heating elements may be halted. In the absence of heat and without an increase in temperature, the ink flow may be halted, the ink may return to the original colors, and the wax contained in the sphere may then return to the original somewhat solid state until the tip 116 encounters another friction force. According to some aspects, the sphere may return to the original color when the temperature may be, for example, less that minus 10° C. While a heated temperature of approximately 70° C. may be detailed to "blank out" the color of the sphere and a temperature of minus 10° C. may be detailed to return the sphere to the original color, these parameters are merely exemplary and may be adjusted according to the desired chemical aspects of the sphere and/or the contents contained within the sphere.

Figure 5:
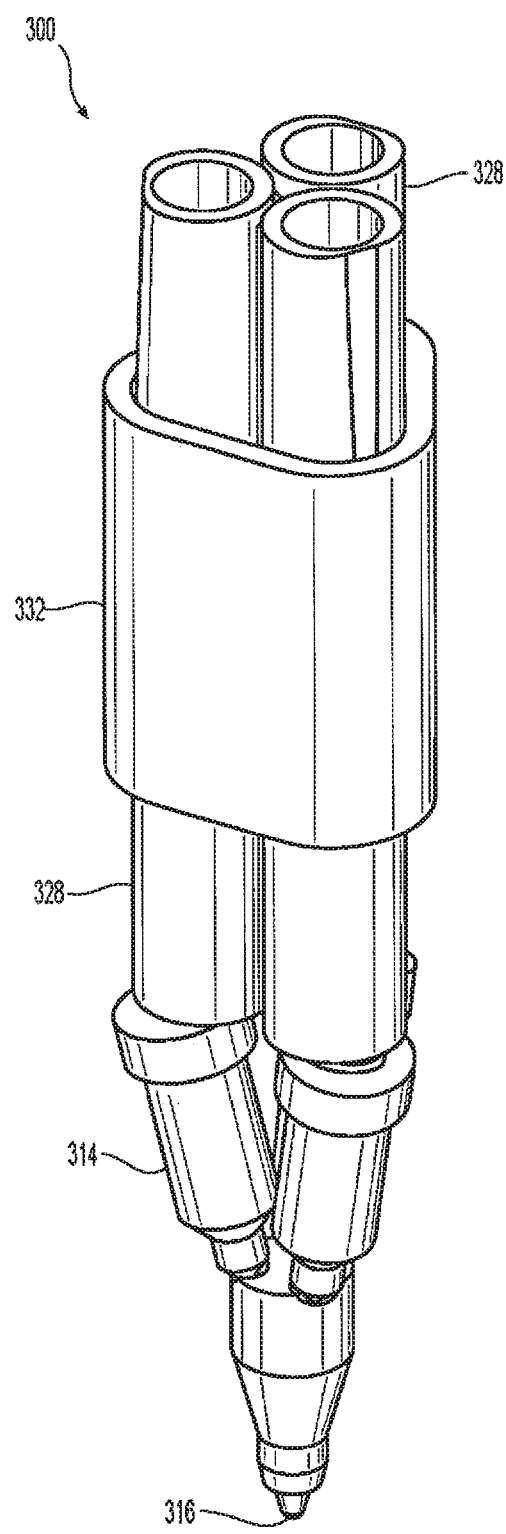
FIG. 5 is a perspective view of another embodiment of an ink supply system.
Figure 6:
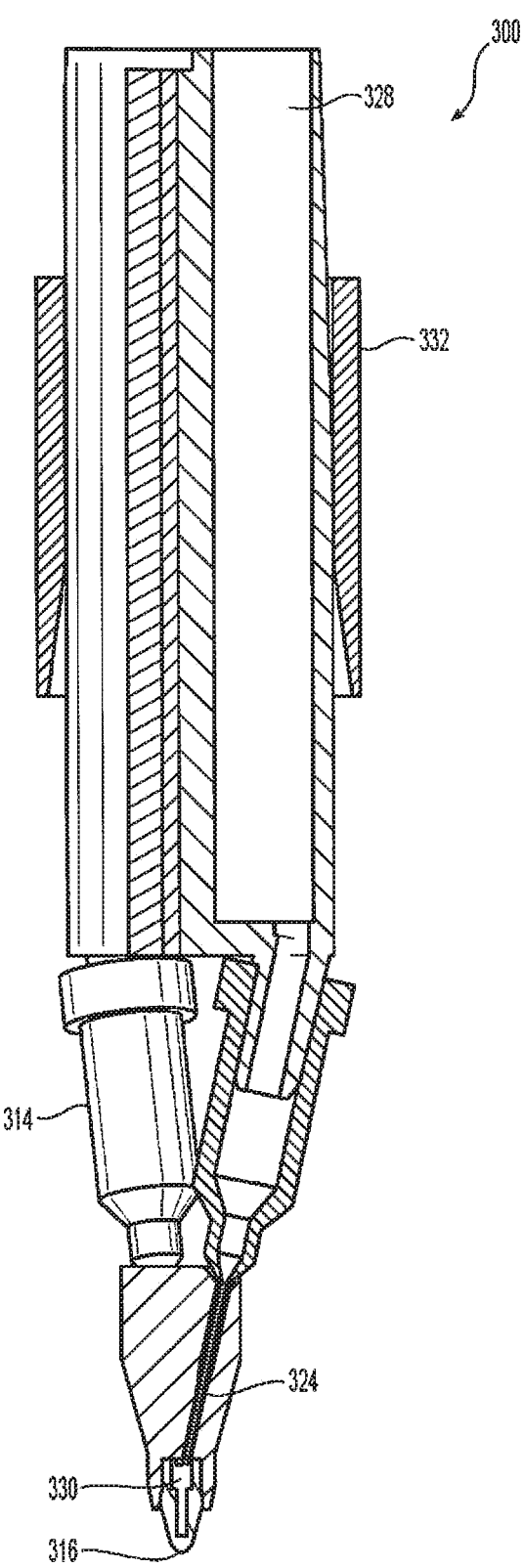
FIG. 6 is a cross-sectional view of the FIG. 5.

According to other aspects, the ink supply system 126, may be, for example, a thermal supply/distribution system 300, as detailed in FIGS. 5 and 6. The thermal supply/distribution system 300 may include a plurality of reservoirs 328 contained in a housing 332. The ink supply channels 314 may be fluidly connected to corresponding ink distribution chambers 324. The plurality of reservoirs 328 may each be fluidly connected to corresponding ink supply channels 314. The thermal supply/distribution system 300 may also include a mixing tank 330 and tip 316. As such, and according to this aspect, the mixing tank 330 and tip 316 may replace the mixing tank 130 and tip 116, as shown in FIGS. 1 and 2. While only three ink reservoirs 328, ink supply channels 314 and ink distribution chambers 324 are shown in FIGS. 5 and 6, the device 100 may include any number of ink reservoirs 328, ink supply channels 314 and ink distribution chambers 324. For example, the thermal supply/distribution system 300 may include three, four, or even five ink reservoirs 328, ink supply channels 314 and ink distribution chambers 324 that may correlate with the cyan, magenta, yellow, black and/or white ink colors that may be used in the CMYK and CMKW color models.

The ink distribution chambers 324 may include a heating mechanism. The heating mechanism used with the ink distribution chambers 324 may include, for example, an electric mechanism capable of being connected to and for receiving a signal from the control unit 122, such as an electrical wire. According to some aspects the heating mechanism may be wrapped about an external surface of the ink distribution chambers 324. The heating mechanism may also be capable of generating heat to increase a temperature of the ink contained therein.

According to some aspects, the thermal supply/distribution system 300 may also be used with a thermochromic ink. The thermochromic ink, may contain, for example, a plurality of micro-spheres in a gel-type substance. The size of the spheres may be, for example, less that 1 μm but not more than 5 μm. Each one of the micro-spheres may contain three components including a dye, developer and solvent. The solvent, may be for example, a wax-type substance. The micro-sphere may appear colored when the dye is attached with the developer and "blanked" or transparent when the dye and developer are detached. The wax-type substance may be somewhat solid and may be heated, by the heating mechanisms, to a desired temperature of, for example, approximately 70° C. wherein the wax may melt thereby initiating a change in color and or "blank out" or "partial blank out" of the small spheres. The heating mechanism, being wrapped about an external surface of the ink distribution chambers 324, may assist with melting the wax-type substance and may assist with facilitating an adjustment/change of the ink contained in the ink distribution chambers 324 to thereby transform the color to the desired scanned color. The transformed colors may be formulated as the result of a signal received from the control unit 122 wherein the ink contained in the reservoirs 328 may be allowed to flow from and be emptied into the ink supply channels 314, and then into the ink distribution chambers 324 where the ink is heated, and later into the mixing tank 330. The mixing tank 330, being positioned at the end-most region of the lower portion 110C of the device 100, may be positioned just prior to the tip 316. Hence, a mix of the adjusted and/or changed colors may be performed just prior to the ink exiting the pin tip 316.

According to other aspects, the ink may contain micro-spheres varying in size and the temperature provided by the heating mechanisms may also vary. Thus, the micro-sphere size and content may dictate the temperature transition of the individual micro-sphere. Depending upon the micro-sphere temperature transition, the thermal supply/distribution system 200 may, at any given time, have a mix of individual micro-spheres separately changing state at different temperatures.

According to further aspects, the tip 316 may also include a sensor. A friction force may be applied to the tip 316 of the device 100 may be detected by the sensor which may initiate a communication to the control unit 122. The control unit 122 may then, in turn, release a signal to the thermal supply/distribution system 300 and heating mechanisms disposed about the ink distribution chambers 324. As noted above, the small spheres containing the color and wax-type substance may be heated, thereby melting the wax and changing the color of the sphere. The spheres may be heated to a desired temperature wherein the color in one or more of ink distribution chambers 324 is "blanked" or "partially blanked". According to some aspects, the color may be "blanked" or transparent when the wax-type substance or solvent in the micro-sphere may be heated to a temperature of, for example, of approximately 70° C. However, and simultaneously, the spheres of ink contained in the remaining ink distribution chambers 324 may be adjusted/changed according to a surge of electrical resistance received from the heating mechanisms until the desired scanned color is obtained. The surge of electrical resistance may be the result of a signal sent from the control unit 122 to the heating mechanisms. The surge of electrical resistance may be the result of a signal received from the scanner and transmitted to the control unit 122. The control unit 122 may then convert the signal received from the scanner to a resistance required to heat the heating mechanisms to the temperature needed to 'blank out" and/or change the color in the ink spheres contained in the ink distribution chambers 324. The 'blanked out", "partially blanked" and/or changed color contained in the ink distribution chambers 324 may flow into the mixing tank 330 and may fluidly communicate to obtain the scanned desired color. The scanned desired color may then flow from the mixing tank 330 and may be released through the tip 316 onto a paper, writing/drawing surface, etc. A release of the friction force from the tip 316 of the device 100, may also detected by the sensor. This release in friction force from the tip 316 may send another signal to the control unit 122 wherein the resistance supplied to the heating elements may be halted. In the absence of heat and without an increase in temperature, the wax contained in the sphere may then return to the original somewhat solid state until the tip 316 encounters another friction force. According to some aspects, the sphere may return to the original color when the temperature may be, for example, less that minus 10° C. While a heated temperature of approximately 70° C. may be detailed to "blank out" the color of the sphere and a temperature of minus 10° C. may be detailed to return the sphere to the original color, these parameters are merely exemplary and may be adjusted according to the desired chemical aspects of the sphere and/or the contents contained within the sphere.

According to further aspects, the sensor, may be positioned near the lower portion 110C of the device 100 near the tip 116, 316 and may include a movement detector, such as, for example, at least one spring and actuator. As such, the movement detector may be positioned with respect to the tip 116, 316 wherein upon application of the friction force on the tip 116, 316 by the user, may facilitate movement of the at least one spring and actuator. The movement detector may then communicate a signal with the control unit 122 to "switch on" the ink flow. As such, ink flow may only be generated when the at least one spring and actuator may be compressed by the friction force and the control unit 122 may be "switched on". Ink may not flow without the detection of a frictional force on the tip 116, 316. Hence, the movement detector may facilitate a signal to communicate with the control unit 122 to "switch off" the ink flow in the absence of the frictional force. The inflow "switch on/switch off" feature may prevent leakage of the ink when the device 100 is not being used.

According to other aspects, the movement detector may be, for example a plurality of magnets and sensors. The magnets and sensors may be disposed on the tip 116, 316 and may be positioned on a movement detector. Application of a friction force on the tip 116, 316 by the user, may facilitate a disconnect of the magnetic fields on the tip 116, 316 and the magnetic fields on the movement detector, thereby initiating a signal from the sensors the control unit 122 to "switch on" the ink flow. As such, ink flow may only be generated when the magnets on the tip 116, 316 may be disconnected from the magnets on the movement detector and the control unit 122 may be "switched on". Ink may not flow without the detection of a frictional force on the tip 116, 316 and when the magnetic fields on the tip 116, 316 may be in contact with the magnetic fields on the movement detector. Hence, when the magnets on the tip 116, 316 may be in contact with the magnets on the movement detector a signal may be communicated to the control unit 122 to "switch off" the ink flow in the absence of the frictional force. The inflow "switch on/switch off" feature may prevent leakage of the ink when the device 100 is not being used.

According to other aspects, the movement detector may be an accelerometer. An accelerometer may detect a more precise assessment of the speed of movement of the device 100. As such, the accelerometer, detecting movement of the device, may cause the sensor to initiate sending a signal to the control unit 122 to "switch on" the ink flow. The accelerometer detecting no movement, may, in turn, cause the sensor to initiate another signal to the control unit 122 whereby the control unit 122 may "switch off" the ink flow. Again, and as according to other aspects, the inflow "switch on/switch off" feature using the accelerometer may prevent leakage of the ink when the device 100 is not being used.

According to further aspects, the movement detector may be, for example, an optical sensor. The optical sensor may include a light and sensors wherein the light may be projected from the tip 116, 316 and the sensors may detect and analyze the texture of surface moving under the light and communicate accordingly a "switch on/switch off" signal to the control unit 122 to "switch on/switch off" ink flow.

According to further aspects, the movement detector may include, for example, a first chamber and a second chamber formed between the mixing tank 130, 330 and the tip 116, 316. Each of the first and second chambers may include a sensor wherein at least one chamber may always be without ink. The chamber without ink may have the sensor positioned closest to the tip thereby "switching off" ink flow to that chamber. The chamber with ink may also have a sensor disposed therein where the sensor may be positioned further away from the tip 116, 316. Hence, with the sensor positioned away from the tip 116, 316, ink flow may be "switched on". According to some aspects, the color may be changed when the sensor in the chamber containing the ink becomes closer to the tip 116, 316 and ink flow may be "switched off" thereby triggering a "switch on" ink flow in the empty chamber. Ink may flow in the empty chamber forcing the sensor away from the tip 116, 316 thereby initiating a "switch on" of ink flow therefrom.

Figure 7:
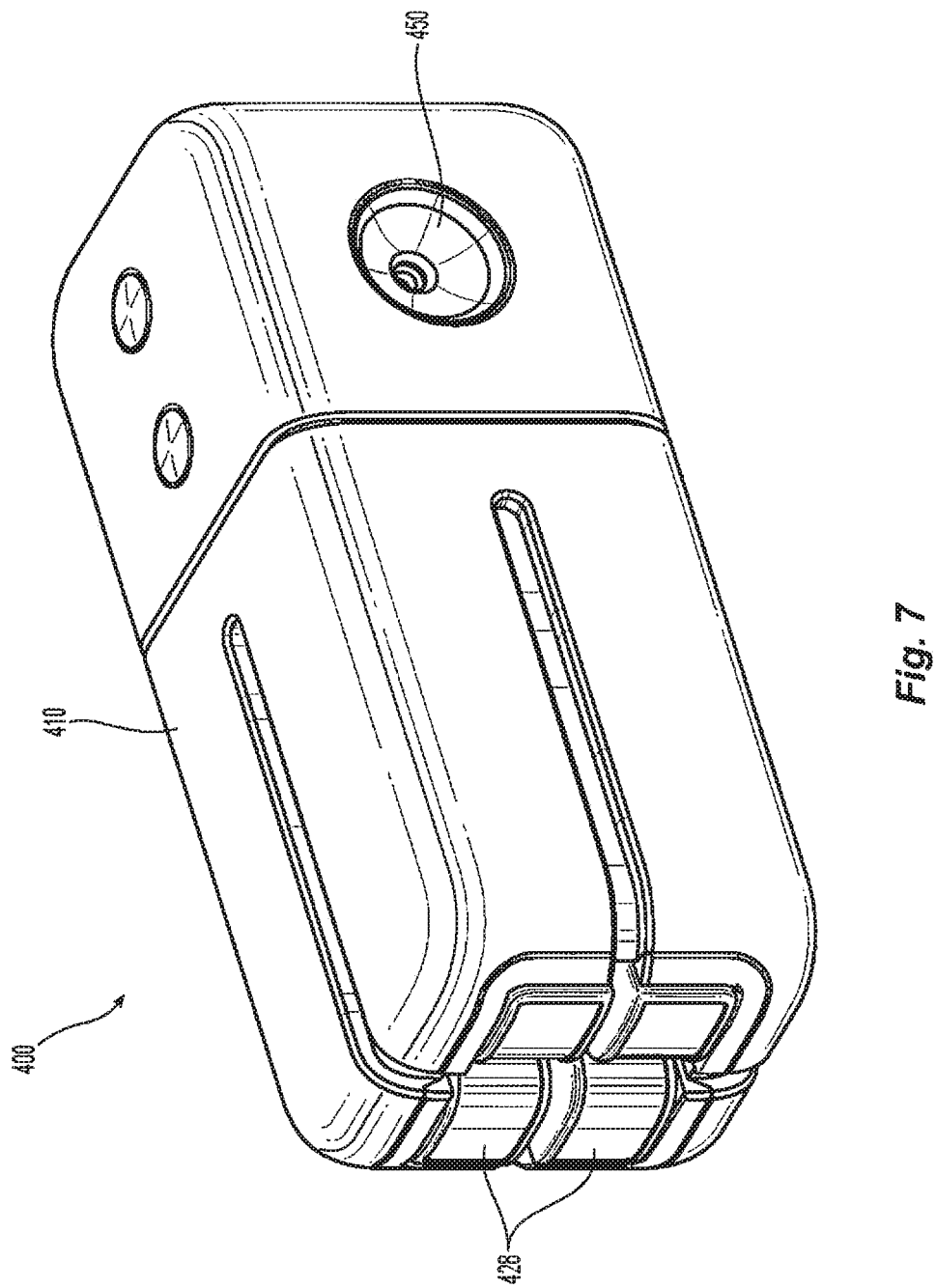
FIG. 7 is a perspective view of yet another in supply system.

According to other aspects, a "stand-alone unit", such as for example, an external ink supply system 400, as shown in FIG. 7, may be used to obtain a certain color on demand. The external ink supply system 400 may include a body 410 which may house at least a plurality of ink reservoirs 428 and a control unit therein. The ink reservoirs 428 may be removable and interchanged by the user. The ink reservoirs 428 may be, for example, three, four, or even five ink reservoirs 428. The color contained in the ink reservoirs may correlate, for example, with the cyan, magenta, yellow, black and/or white ink colors that may be used in the CMYK and CMYKW color models.

According to some aspects, the control unit of the external ink supply system 400 may be operable to control the selection and proportions of colors needed from the CMYK and CMYKW color models to create or reproduce the requested color specified by the user on demand. According to further aspects, the external ink supply system 400 may also include a scanner and may be capable of communicating by being hardwired or through wireless communication such as, for example, Wi-Fi or Bluetooth with a personal electronic device such as a cellphone to reproduce a desired color on demand. Additionally, the body 410 of the external ink supply system 400 may further include color selection mechanism such as, for example, a button, dial or slide indicator where the user may be able to physically personalize a color on demand by individual selection.

According to further aspects, the body 410 of the external ink supply system 400 may include a plug or port 450. A desired color or user-created color may be mixed internally of the external ink supply system 400 and extracted from the external ink supply system 400 through the plug or port 450. The plug or port 450 may then be used to facilitate a transfer of the color desired, selected and/or created to the user. As such, and according to some aspects, a completed reproduced color may be retrieved from the external ink supply system 400 by the user simply connecting and/or positioning a device such as, for example, an empty cartridge, ink reservoir, bottle, cup, paint dish etc. with respect to the plug or port 450 to extract the desired color selected and/or created on demand from the plug or port 450.

It will be appreciated by those skilled in the art that changes could be made to the embodiments described above without departing from the broad inventive concept thereof. It is understood, therefore, that the present disclosure herein is not limited to the particular embodiments disclosed and is intended to cover modifications within the spirit and scope of the present disclosure.

The invention claimed is:

1. A device for producing colors on demand, the device comprising:
   an inspection tool for capturing the color;
   a plurality of ink reservoirs, each one of the plurality of ink reservoirs configured to hold a different color thermochromic ink;
   an ink supply system fluidly connected to the plurality of ink reservoirs, the ink supply system being configured to receive the thermochromic ink from the plurality of ink reservoirs and including a heating mechanism to control the color of the thermochromic ink disposed therein;
   a mixing chamber fluidly connected to the ink supply system and being configured to mix the thermochromic ink received from the ink supply system; and
   a control unit operatively connected to the plurality of ink reservoirs, the ink supply system and the inspection tool for controllably reproducing and dispersing the color captured by the inspection tool,
   wherein the heating mechanism includes an electric wire wrapped around the mixing chamber.

2. The device of claim 1, further including a sensor, the sensor being positioned adjacent to a tip disposed in the device.

3. The device of claim 2, wherein the sensor is a movement detector, the movement detector sensing a movement of the tip of the device.

4. The device of claim 3, wherein the movement detector is a spring and actuator.

5. The device of claim 3, wherein the movement detector includes magnets disposed near the tip of the device.

6. The device of claim 3, wherein the control unit is configured to send a signal to the plurality of ink reservoirs or the ink supply system to initiate a flow of the thermochromic ink, only after receiving a signal from the movement detector indicating movement of the tip.

7. The device of claim 6, wherein the control unit is configured to send a signal to the plurality of ink reservoirs or the ink supply system to cease a flow of the thermochromic ink after receiving a signal from the movement detector indicating an absence of force detected by the movement detector.

8. The device of claim 1, wherein the heating mechanism is disposed in a supply channel.

9. The device of claim 1, wherein the device is a writing instrument.

10. The device of claim 9, wherein the writing instrument is a pen.

11. The device of claim 1, wherein the ink supply system includes at least one ink supply channel in fluid communication with one of the plurality of ink reservoirs.

12. The device of claim 1, wherein the control unit is configured to determine a resistance to heat the heating mechanism based on a signal received from the inspection tool.

13. The device of claim 1, wherein the inspection tool includes a scanner.

14. The device of claim 1, wherein the inspection tool includes a camera.

15. The device of claim 1, wherein the control unit includes a radio frequency identification (RFID) circuit or a microelectro-mechanical system (MEMS).

16. The device of claim 1, wherein the control unit includes electrical or mechanical components.

17. The device of claim 1, wherein the thermochromic ink includes microspheres, wherein each microsphere includes a dye, a developer, and a solvent, and wherein the control unit is configured to send a signal to the heating mechanism to heat the thermochromic ink to a temperature that causes the dye and the developer to detach from one another.

18. A writing instrument for producing color on demand, the writing instrument comprising:
   an inspection tool for capturing the color;
   a plurality of ink reservoirs, each one of the plurality of ink reservoirs configured to hold a different color thermochromic ink;
   an ink supply system fluidly connected to the plurality of ink reservoirs, the ink supply system being configured to receive the thermochromic ink from the plurality of ink reservoirs and including a heating mechanism to control the color of the thermochromic ink disposed therein;
   a mixing chamber fluidly connected to the ink supply system and being configured to mix the thermochromic ink received from the ink supply system; and a control unit operatively connected to the plurality of ink reservoirs, the ink supply system and the inspection tool for controllably reproducing and dispersing the color captured by the inspection tool, wherein the heating mechanism includes an electric wire wrapped around the mixing chamber.

19. A device for producing colors on demand comprising:

an inspection tool for capturing the color;

a plurality of ink reservoirs, each one of the plurality of ink reservoirs holding a different color thermochromic ink;

a mixing chamber configured to receive and mix the thermochromic ink;

an electric wire disposed around the mixing chamber, the electric wire being configured to generate heat to control the color of the thermochromic ink; and a controller operatively connected to the plurality of ink reservoirs, the electric wire and the inspection tool, the controller being configured to generate signals for reproducing and dispersing the color captured by the inspection tool.

20. The device of claim 19, further including an ink supply system fluidly connected to the plurality of ink reservoirs, the ink supply system being configured to receive the thermochromic ink from the plurality of ink reservoirs, wherein the mixing chamber is configured to receive the thermochromic ink from the ink supply system.

\* \* \* \* \*